3,429,896
CHROMONE AND THIOCHROMONE GUANYLHYDRAZONES
Friedrich Bossert, Wuppertal-Elberfeld, and Wulf Vater, Opladen, Germany, assignors to Farbenfabriken Bayer Aktiengesellschaft, Leverkusen, Germany, a corporation of Germany
No Drawing. Filed Sept. 29, 1965, Ser. No. 491,450
Claims priority, application Germany, Oct. 1, 1964, F 44,112
U.S. Cl. 260—327      8 Claims
Int. Cl. C07d 7/32, 65/14; A61k 27/00

ABSTRACT OF THE DISCLOSURE

Disclosed are guanylhydrazones of hydroxyacetic acid-substituted chromones and thiochromones which have coronary dilator activity. These products are prepared, for example, by heating the chromone or thiochromone hydroxyacetic acid compound with an aminoguanidine hydrohalide in alcohol.

---

The present invention relates to novel chromone and thiochromone guanylhydrazones, and their pharmaceutically acceptable non-toxic salts with inorganic and organic acids, characterized by useful coronary dilator activity, and to their production from chromone and thiochromone derivatives.

Due to the known coronary activity of Khellin, chromones have attained considerable importance in recent years. Guanylhydrazones of chromones and thiochromones have hitherto not been known, however, and have much better coronary dilator activity with less side effects and greater safety.

It has now been found that compounds having useful and valuable coronary dilating activity are obtained when a chromone or thiochromone derivative of the formula:

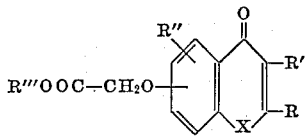

in which X is oxygen or sulphur, R and R' are each hydrogen, alkyl, alkyl interrupted by oxygen, nitrogen or sulphur, hydroxyalkyl, cycloalkyl, phenyl, benzyl, benzyl substituted by alkyl, alkoxy or halogen, or a heterocyclic radical such as pyridyl, furyl or thienyl, R" is alkyl, alkoxy or halogen, and R''' is alkyl, alkyl interrupted by oxygen, nitrogen or sulphur, mono- or poly-hydroxy-alkyl, cycloalkyl, benzyl or furyl is (a) reacted with an aminoguanidine of the formula:

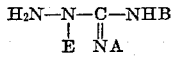

in which A and E are each hydrogen or a branched, straight-chain or alicyclic alkyl group of 1–6 carbon atoms, which may be substituted by one or more hydroxyl groups, and B is hydrogen, a branched, straight-chain or alicyclic alkyl group of 1–6 carbon atoms, which may be unsubstituted or substituted by one or more hydroxyl groups and may also be linked with A, as via a hetero atom such as N, O or S, a nitro or an amino group or a basic radical of the formula D, wherein

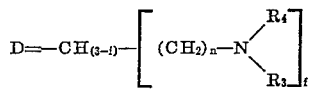

in which n is 0 to 8, f is 1 or 2, $R_3$ and $R_4$ are each hydrogen or the same or different branched, straight-chain or alicyclic alkyl groups of up to 6 carbon atoms, which may be unsubstituted or substituted by one or more hydroxyl groups and may be linked with one another, as via a hetero atom such as N, S or O, or a salt thereof, or (b) condensed with a thiosemicarbazide of the formula:

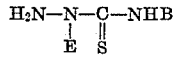

and the condensation product either allowed to react with an amine of the formula $H_2NA$ or first converted into an S-alkyl-isothiosemicarbazone and then reacted with an amine of the formula $H_2NA$, or (c) reacted with an S-alkyl-isothiosemicarbazide of the formula:

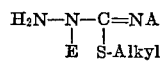

and the product thereof reacted with an amine of the formula: $H_2N$—B, or (d) first condensed with a hydrazine of the formula:

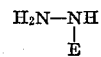

and the product reacted with a cyanamide of the formula: NC—NHB or with an S-alkyl-isothiourea of the formula:

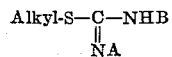

in which A, E and B have the above meanings.

In the form of their pharmaceutically acceptable salts with usual non-toxic organic and inorganic acids the new compounds are stable and water-soluble substances which have beneficial circulatory activity. A marked and long-lasting dilating effect on the coronary system is primarily detectable upon administration in the usual manner for coronary dilators.

The production of the chromones or thiochromones required as intermediates can be effected by reacting the corresponding hydroxy compounds with chloroacetic esters, or directly from phenols and α-acyl-fatty acid esters by means of phosphorus pentoxide (chromones) or from thiophenols and α-acyl-fatty acid esters with polyphosphoric acid (thiochromones).

Suitable starting materials are, for example:

chromone-7-hydroxyacetic acid ethyl ester,
thiochromone-7-hydroxyacetic acid ethyl ester,
2-methyl-chromone-5-hydroxyacetic acid ethyl ester,
2-methyl-chromone-6-hydroxyacetic acid ethyl ester,
2-methyl-chromone-8-hydroxyacetic acid ethyl ester,
2-methyl-thiochromone-6-hydroxyacetic acid ethyl ester,
2-methyl-thiochromone-8-hydroxyacetic acid ethyl ester,
2,5-dimethyl-thiochromone-8-hydroxyacetic acid ethyl ester,
2-methyl-5-methoxy-thiochromone-8-hydroxyacetic acid ethyl ester,
2-methyl-5-chlorothiochromone-8-hydroxyacetic acid ethyl ester,
2-methyl-chromone-(or 2-methyl-thiochromone)-7-hydroxyacetic acid methyl, ethyl, propyl, isopropyl, butyl, benzyl or furfuryl ester,
2-ethyl-chromone-7-hydroxyacetic acid ethyl ester,
2-isopropyl-thiochromone-7-hydroxyacetic acid ethyl ester,
2-hexahydrobenzene-thiochromone-7-hydroxyacetic acid ethyl ester,
2-(α-, β- or γ-pyridyl)thiochromone-7-hydroxyacetic acid ethyl ester,
2-pyridyl-chromone-7-hydroxyacetic acid ethyl ester,
3-methyl-chromone-7-hydroxyacetic acid ethyl ester,
3-methyl-thiochromone-7-hydroxyacetic acid ethyl ester,
3-phenyl-chromone-(or 3-phenyl-thiochromone-)7-hydroxyacetic acid ethyl ester, 2-phenyl-chromone-7-hydroxyacetic acid ethyl ester,
2-phenyl-thiochromone-7-hydroxyacetic acid ethyl ester,
2-(4'-methylphenyl)-chromone-7-hydroxyacetic acid ethyl ester,
2-(4'-methoxyphenyl)-thiochromone-7-hydroxyacetic acid ethyl acid,
2-(4'-chlorophenyl)-thiochromone-7-hydroxyacetic acid ethyl ester,
2-(α-furyl)-chromone-7-hydroxyacetic acid ethyl ester,
2-(α-furyl)-thiochromone-7-hydroxyacetic acid ethyl ester,
2-methyl-3-(β-diethyl-aminoethyl)thiochromone-7-hydroxyacetic acid ethyl ester, and
2-methyl-3-(β-hydroxy-ethyl)-thiochromone-7-hydroxyacetic acid ethyl ester.

The invention is illustrated by the following non-limitative examples:

EXAMPLE 1

52 grams of 2-methyl-chromone-7-hydroxyacetic acid ethyl ester (M.P. 104° C.) and 25 g. of aminoguanidine hydrochloride are heated for 24 hours in 150 ml. of alcohol, after the addition of a few drops of hydrochloric acid 120 ml. of ethyl acetate are added, the reaction mixture is briefly boiled and filtered off, and, after cooling and suction filtration, there are obtained 50 g. of almost colorless crystals of M.P. 212–215° C.

Similarly, crystals of M.P. 228–230° C. are obtained from 2-methyl-thiochromone-7-hydroxyacetic acid ethyl ester (M.P. 128° C.) and aminoguanidine hydrochloride.

EXAMPLE 2

By heating for 24 hours 11 g. of thioflavone-7-hydroxyacetic acid ethyl ester (M.P. 140° C.) with 4 g. of aminoguanidine hydrochloride in 250 ml. of alcohol, there are obtained 13 g. of pale yellow crystals of M.P. 245–248° C.

The pale yellow compound obtained from flavone-7-hydroxyacetic acid ethyl ester and aminoguanidine hydrochloride melts at 240–242° C.

EXAMPLE 3

11 grams of thioflavone-8-hydroxyacetic acid ethyl ester (M.P. 142° C.) and 4 g. of aminoguanidine hydrochloride are boiled overnight in 200 ml. of alcohol, the reaction mixture is filtered off and, after cooling and suction filtration, there are obtained 11 g. of orange-yellow crystals of M.P. 234° C.

EXAMPLE 4

After boiling for 24 hours 11 g. of thioflavone-7-hydroxyacetic acid ethyl ester and 9 g. of 1-(β-diethylamino-ethyl)-3-aminoguanidine hydrochloride in 200 ml. of alcohol, the reaction mixture is filtered off, cooled, and the product suction-filtered. 11 grams of orange-red crystals of M.P. 147° C. are obtained.

EXAMPLE 5

10 grams of 2-methyl-thiochromone-6-hydroxyacetic acid ethyl ester (M.P. 138° C.) and 5 g. of aminoguanidine hydrochloride are heated at boiling temperature in 250 ml. of alcohol for 24 hours. After suction-filtration, there are obtained 11 g. of pale brown crystals of M.P. 175° C.

The compound prepared from 2-methyl-chromone-6-hydroxyacetic acid ethyl ester (M.P. 109–110° C.) and aminoguanidine hydrochloride has a M.P. of 142° C.

EXAMPLE 6

13 grams of 2,5-dimethyl-thiochromone-8-hydroxyacetic acid ethyl ester (M.P. 110° C.) and 6 g. of aminoguanidine hydrochloride are heated overnight in 200 ml. of alcohol, and pale yellow crystals of M.P. 160° C. are thus obtained.

EXAMPLE 7

A solution of 12 grams of 2-methyl-chromone-7-hydroxyacetic acid methyl ester (M.P. 106–108° C.) and 6 g. aminoguanidine hydrochloride in 100 ml. methanol is boiled for several hours in presence of a few drops of hydrochloric acid. There are obtained crystals of M.P. 251–253° C.

In an analogous manner the guanylhydrazones of the following compounds are obtained:

2-methyl-chromone-7-hydroxyacetic acid propylester (M.P. 90–92° C.): 200–202° C.;
2-methyl-chromone-7-hydroxyacetic acid isopropyl ester (M.P. 144–146° C.): 220–222° C.;
2-methyl-chromone-7-hydroxyacetic acid butyl ester (M.P. 81–82° C.): 180–182° C.

What is claimed is:

1. The chromone guanylhydrazone obtained by the reaction of 2-methyl-chromone-7-hydroxyacetic acid methyl, ethyl, propyl, isopropyl or butyl ester and aminoguanidine hydrochloride in alcohol at elevated temperature.

2. The thiochromone guanylhydrazone obtained by the reaction of 2-methyl-thiochromone-7-hydroxyacetic acid ethyl ester and aminoguanidine hydrochloride in alcohol at elevated temperature.

3. The thiochromone guanyltydrazone obtained by the reaction of thioflavone-7-hydroxyacetic acid ethyl ester and aminoguanidine hydrochloride in alcohol at elevated temperature.

4. The thiochromone guanylhydrazone obtained by the reaction of thioflavone-8-hydroxyacetic acid ethyl ester and aminoguanidine hydrochloride in alcohol at elevated temperature.

5. The thiochromone guanylhydrazone obtained by the reaction of thioflavone-7-hydroxyacetic acid ethyl ester and 1 - (β-diethylamino-ethyl)-3-aminoguanidine hydrochloride in alcohol at elevated temperature.

6. The thiochromone guanylhydrazone obtained by the reaction of 2-methyl-thiochromone-6-hydroxyacetic acid ethyl ester and aminoguanidine hydrochloride in alcohol at elevated temperature.

7. The chromone guanylhydrazone obtained by the reaction of 2-methyl-chromone-6-hydroxyacetic acid ethyl ester and aminoguanidine hydrochloride in alcohol at elevated temperature.

8. The thiochromone guanylhydrazone obtained by the reaction of 2,5-dimethyl-thiochromone - 8 - hydroxyacetic acid ethyl ester and aminoguanidine hydrochloride in alcohol at elevated temperature.

References Cited
UNITED STATES PATENTS 2,897,211  7/1959  Da Re _____ 260—345.2

JAMES A. PATTEN, *Primary Examiner.*

U.S. Cl. X.R.

260—294.8, 295, 332.2, 345.2, 345.5